US008045488B2

(12) United States Patent
Swan

(10) Patent No.: US 8,045,488 B2
(45) Date of Patent: Oct. 25, 2011

(54) USING SPANNING TREE PROTOCOL (STP) TO ENHANCE LAYER-2 NETWORK TOPOLOGY MAPS

(75) Inventor: Michael Jon Swan, Lafayette, CA (US)

(73) Assignee: Solarwinds Worldwide LLC, Austin, TX (US)

( * ) Notice: Subject to any disclaimer, the term of this patent is extended or adjusted under 35 U.S.C. 154(b) by 624 days.

(21) Appl. No.: 12/153,274

(22) Filed: May 15, 2008

(65) Prior Publication Data

US 2009/0285128 A1    Nov. 19, 2009

(51) Int. Cl.
  *H04L 12/28*    (2006.01)
(52) U.S. Cl. ........................................ 370/256; 370/401
(58) Field of Classification Search .................. None
  See application file for complete search history.

(56) References Cited

U.S. PATENT DOCUMENTS

| 5,727,157 | A  | * | 3/1998  | Orr et al. ........................ 709/224 |
| 6,128,296 | A  | * | 10/2000 | Daruwalla et al. ............. 370/389 |
| 6,256,295 | B1 | * | 7/2001  | Callon ........................... 370/254 |
| 2002/0046271 | A1 | * | 4/2002 | Huang ........................... 709/223 |
| 2003/0086425 | A1 | * | 5/2003 | Bearden et al. ................ 370/392 |
| 2008/0049778 | A1 | * | 2/2008 | Yano et al. ..................... 370/422 |
| 2010/0020722 | A1 | * | 1/2010 | Farkas et al. .................. 370/254 |

FOREIGN PATENT DOCUMENTS

EP    0 684 716 A1    11/1995

OTHER PUBLICATIONS

Perlman, R. Ed, "Interconnections, Bridges and Routers", Jan. 1, 1992, pp. 54-59, Addison Wesley, Reading, MA 01867-3932 U.S.
IEEE Std 802.1D-2004, "IEEE Standard for Local and Metropolitan Area Networks—Media Access Control (MAC) Bridges", Jun. 9, 2004, pp. 1-56, IEEE, 3 Park Avenue, New York, NY 10016-5997, USA.
International Search Report for International Application No. PCT/US2009/002110.

* cited by examiner

*Primary Examiner* — Gregory Sefcheck
*Assistant Examiner* — Daniel Mitchell
(74) *Attorney, Agent, or Firm* — Squire, Sanders & Dempsey (US) LLP

(57) ABSTRACT

Spanning Tree Protocol (STP) data is obtained via network switch (SNMP) queries to enhance identification of switch-to-switch links in Layer-2 mapping. In particular, by analyzing the STP data, ambiguity in determining switch uplink ports may be reduced. Specifically, the STP data can be used in conjunction with other topography data to provide Layer-2 connectivity for nodes on a network topology. Layer-2 address mapping tables are collected from a topology mapping, and STP data is collected, along with address translation tables (ARP) tables. Using this information, switches are identified using Layer-2 address tables. The STP data can be correlated by comparing data in switches, identifying switch ports directly connected to other switch ports, and eliminating direct switch-to-switch port connections from consideration for further Layer-2 node mappings.

33 Claims, 4 Drawing Sheets

```
┌─────────────────────────────┐
│ Define Mapping Criteria     │
│ 210                         │
└─────────────────────────────┘
```

Search for Nodes

220

- Search for nodes in blocks of N IP addresses using user-configured discovery methods
  221

- If a hop count > 0 was defined, repeat step 221 with newly discovered network ranges until hop count is reached
  223

- Determine Layer 3 connectivity from discovered nodes.
  222

- Determine Layer 2 connectivity from any discovered nodes identified as a managed switch or hub.
  224

- Correlate Layer 2 and Layer 3 address data from steps 221-224 by use of address translation tables (ARP) and Spanning Tree tables collected from discovered SNMP-capable nodes.
  225

- Determine network connectivity by examining each discovered nodes IP address(es). Layer 2 connectivity is used when available; Layer 3 connectivity is used otherwise.
  226

Store Search Results
230

300

400

USING SPANNING TREE PROTOCOL (STP) TO ENHANCE LAYER-2 NETWORK TOPOLOGY MAPS

FIELD OF THE INVENTION

Spanning Tree Protocol (STP) data obtained via network switch (SNMP) queries may be used to enhance identification of switch-to-switch links in Layer-2 mapping. In particular, by analyzing the STP data, ambiguity in determining switch uplink ports may be reduced. Specifically, the STP data can be used in conjunction with other data to provide Layer-2 connectivity for nodes on a network topology.

BACKGROUND OF THE INVENTION

Network topology is the study of the arrangement or mapping of the elements (links, nodes, etc.) of a network, especially the physical (real) and logical (virtual) interconnections between nodes. A local area network (LAN) is one example of a network that exhibits both a physical topology and a logical topology. Any given node in the LAN will have one or more links to one or more other nodes in the network and the mapping of these links and nodes onto a graph results in a geometrical shape that determines the physical topology of the network. Likewise, the mapping of the flow of data between the nodes in the network determines the logical topology of the network.

Thus, network topology describes the specific physical or logical arrangement of the elements of a network. The elements may be physical or logical such that physical elements are real, and logical elements may be, for example virtual elements or an arrangement of the elements of a network. Two networks may share a similar topology if the connection configuration is the same, although the networks may differ in other aspects such as physical interconnections, domains, distances between nodes, transmission rates, and/or signal types. A network may incorporate multiple smaller networks. By way of example, a private telephone exchange is a network and that network is part of a local telephone exchange. The local exchange is part of a larger network of telephones which permit international calls, and is networked with cellular telephone networks.

Any particular network topology is determined only by the graphical mapping of the configuration of physical and/or logical connections between nodes. LAN Network Topology is, therefore, technically a part of graph theory. Distances between nodes, physical interconnections, transmission rates, and/or signal types may differ in two networks and yet their topologies may be identical. The arrangement or mapping of the elements of a network gives rise to certain basic topologies which may then be combined to form more complex topologies (hybrid topologies). The most common of these basic types of topologies include bus (such as Linear, Distributed Bus), star, ring, mesh (including a partially connected or a fully connected mesh), tree, hybrid that is composed of one or more network topologies, and point-to-Point.

Logical topology corresponds to a mapping of the apparent connections between the nodes of a network, as evidenced by the path that data appears to take when traveling between the nodes. The logical classification of network topologies generally follows the same classifications as those in the physical classifications of network topologies, the path that the data takes between nodes being used to determine the topology as opposed to the actual physical connections being used to determine the topology. Logical topologies are often closely associated with media access control (MAC) methods and protocols. The logical topologies are generally determined by network protocols as opposed to being determined by the physical layout of cables, wires, and network devices or by the flow of the electrical signals, although in many cases the paths that the electrical signals take between nodes may closely match the logical flow of data, hence the convention of using the terms 'logical topology' and 'signal topology' interchangeably. Logical topologies are typically able to be dynamically reconfigured by special types of equipment such as routers and switches.

Layer-2 topology mapping is difficult to accomplish because of the way Layer-2 switching data is organized within switches. A switch maintains a table of MAC addresses organized by port where each port has one or more MAC address entries for every MAC address received on that port. In the simplest example, a port in the table will have a single MAC address which can be used to uniquely map a network node that corresponds to that single MAC address to the given switch port. However, even this simplest case may not represent the true topology as switch tables can contain out-of-date or incomplete data depending on the network traffic that flows through the switch.

Further complicating Layer-2 topology mapping is the port data associated with links between switches. For example, when one switch, e.g. T1, is directly connected to another switch, e.g. T2 on port 3, the table maintained in switch T2 is likely to have many MAC address entries for port 3. This storage of multiple MAC address entries for port 3 is because some or all of the MAC addresses known by switch T1 that transmit data through switch T2 will be present in switch T2, port 3. It is these intra-switch links that present the most difficult challenge in rendering accurate network topology maps.

In conventional methodologies, STP data is regularly transmitted between switches for two general purposes: (a) to identify and prevent loops in network topology and (b) to select the fastest routes between switches when redundant switch links are present. Switches that implement STP maintain a table of directly-connected neighbor switches based on receipt of these periodic data. These STP table data can be used to identify intra-switch links and thereby reduce the complexity in rendering intra-switch connections and identifying and rendering other Layer-2 network connections.

SUMMARY OF THE INVENTION

In response to these and other needs, embodiments of the present application relate to forming a topology mapping by forming an initial mapping of the topology of a network. Layer-2 address mapping tables are collected from the topology mapping. Spanning Tree Protocol (STP) data is then also collected, along with address translation tables (ARP) tables. Using this information, switches are identified using Layer-2 address tables. The STP data can be correlated by comparing data in switches, identifying switch ports directly connected to other switch ports, and eliminating direct switch-to-switch port connections from consideration for further Layer-2 node mappings.

Optionally, the mapping a topology of a network includes transferring synthetic data within the network; and tracing the synthetic data. For example, the mapping the topology of the network may include searching for nodes in a pre-defined number of internet protocol (IP) addresses, and repeating the search for a predefined number of hops. Then, the Layer-2 and Layer-3 connectivity may be determined from any discovered nodes, the Layer-2 and Layer-3 address data correlated, and the network connectivity of discovered IP addresses determined. Also, the mapping of the topology of the network may include receiving and storing user preferences comprising the size of the block of IP addresses and the number of hops.

The correlating of the STP data may include locating entries for a switch in an associated STP table. For the switch, a base bridge address is compared with a designated bridge address, and the base bridge address is compared with a neighbor's designated bridge address. A Layer-2 address corresponding to an address of the neighbors port is located, but when no neighbors port Layer-2 address is found, a synthetic entry is created. A neighbor switch node that is defined by either the found Layer-2 address or the synthetic entry is then stored, and other Layer-2 addresses in the switch are invalidated. For instance, the comparing of the switch's base bridge address with a neighbor switch's designated bridge address may include, for each table entry that identifies a neighbor switch node Tt, comparing each base bridge address the neighbor switch's Layer-2 Address table with the designated bridge address in switch Tt. When the designated bridge address and the neighbor's base bridge address match, the designated port in the switch Tt entry is compared with a designated port in the switch Tn entry. When the designated port in the switch Tt entry corresponds with the designated port in the switch Tn entry, a direct connection is determined between the switch Tt and the switch Tn. In this way, switch ports at each end of connection are identified.

The invalidating of other Layer-2 addresses in said switch includes invalidating all other Layer-2 Address table entries in switch Tt whose bridge (switch) port matches the identified bridge port. These invalidated entries correspond to Layer-2 addresses downstream from the switch-to-switch connections and are not useful for Layer-2 connectivity within the network topology.

DESCRIPTION OF THE DRAWINGS BRIEF

For proper understanding of the invention, reference should be made to the accompanying drawings, wherein:

FIG. 2 is a flow chart of a network mapping method in accordance with embodiments of the present application.

DETAILED DESCRIPTION OF THE PREFERRED EMBODIMENTS

Figure 1:
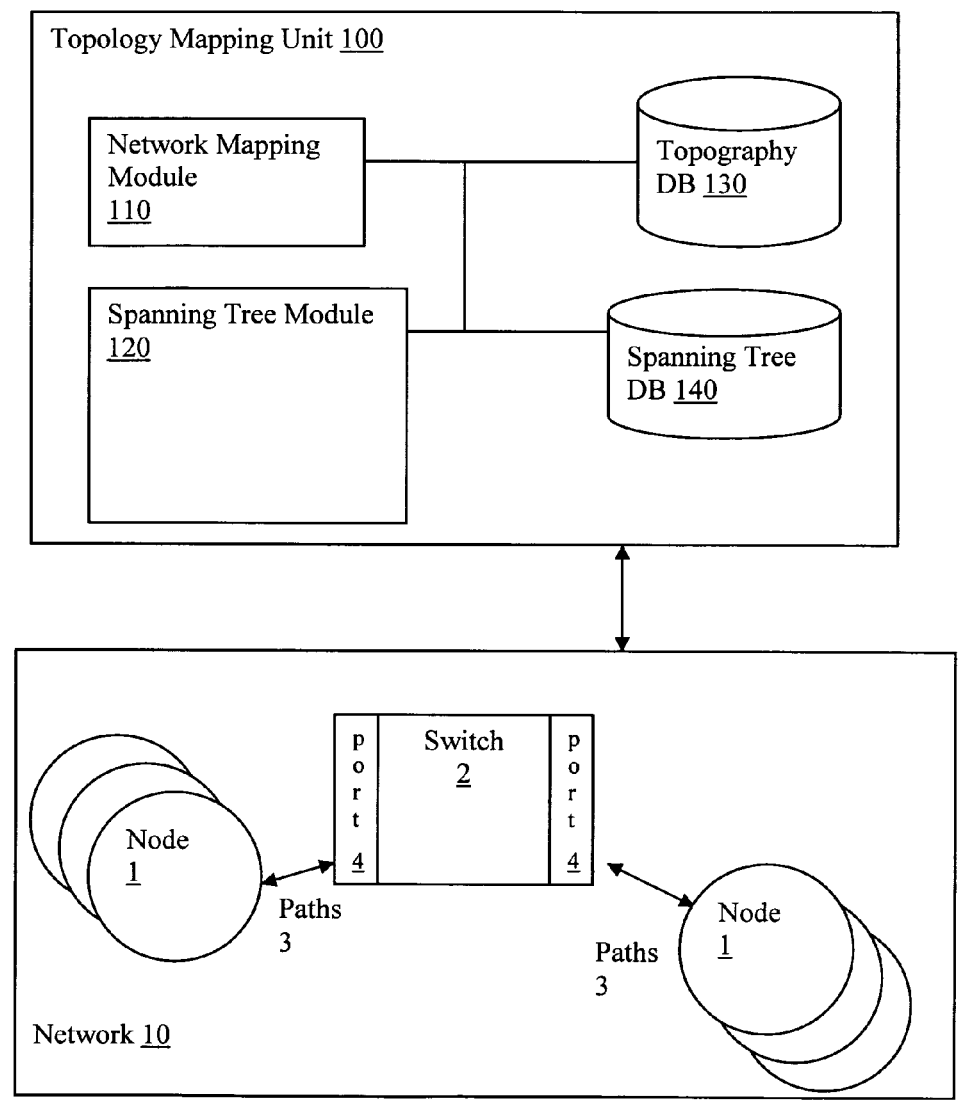
FIG. 1 is a high level schematic diagram of a STP enhanced mapping system in accordance with embodiments of the present application.

Referring to FIG. 1, embodiments of the present application relate to a topology mapping unit 100 configured to connect to network 10 that includes, for example, multiple nodes 1, switches 2 with multiple ports 4, and paths 3.

The topology mapping unit 100 includes a mapping module 110. In particular, the mapping module 110 is configured to map components in the network 10. Various network topography mapping techniques are known and may be integrated within the embodiments of the present application, as described in greater detail below.

The mapping module 110 automatically discovers everything on the network, including desktops, servers, printers, switches and routers using identification and discovery methods (ping/ICMP, SNMP, SIP-based VoIP, NetBIOS and more) to scan IP address ranges and find nodes, as described below in FIG. 2.

Referring now to FIG. 2, a mapping method 200 in accordance with embodiments of the present application is provided. In particular, the mapping method 200 includes the step of defining mapping data criteria in step 210. For example, a user may define a range of IP addresses, the number of hops (or connected devices from each discovered device), and types of devices (e.g., SNMP devices or responder clients) to be discovered during the search.

Continuing with FIG. 2, in step 220, a node search is performed. For example, types of discovery methods such as ICMP Ping, NetBIOS, SIP clients, etc. entail transmission of small UDP or ICMP packets to each IP address in the defined range, as well as discovery of devices within the number hops from the devices discovered. Thus, data is sent and tracked for each defined IP address to determine the device associated with an IP address and the physical and virtual paths used to reach the respective IP address. Optionally, large IP address ranges are subdivided into fixed blocks of addresses, such as blocks of 30 address, with responses searched from those addresses. By searching the network in this way with small data packets being exchanged with a limited number of addresses, noticeable affects are minimized in network bandwidth or devices.

Continuing with FIG. 2, the node discovery in step 220 is described in greater detail. Search for nodes in blocks of a pre-selected number N of IP addresses using user-configured discovery methods, step 221. Then, the Layer-3 connectivity can be determined from discovered nodes in step 222. If a hop count>0 was defined, repeat step 221 with newly discovered network ranges until hop count is reached, step 223. Then, Layer-2 connectivity is determined from any discovered nodes identified as a managed switch in step 224. The Layer-2 and Layer-3 address data from steps 221-224 are then correlated, for example, by use of address translation tables (ARP) and Spanning Tree tables collected from discovered SNMP-capable nodes in step 225. Then, the network connectivity is determined in step 226 by examining each discovered nodes IP address(es). Layer-2 connectivity is used when available; Layer-3 connectivity is used otherwise.

The network topology search results are stored in step 230. For example, the mapping module 110 may collect and store all topology information in a database 140, providing a source of topology and asset information for enterprise configuration management database (CMDB) strategies. The mapping module 110 also automatically maintains this data to update the network nodes, thereby, providing network engineers with a constantly-accurate representation of the network for visibility and compliance requirements.

Optionally, the network topology search results are stored in step 230. For example, once network nodes are discovered, the mapping module 110 may compile the information into a cohesive, easy-to-view network topology map, for example, with node icons and colored lines representing network connectivity speed on a user interface 130. In this way, the mapping module 110 enables network engineers to see exactly how devices in the network are connected. The mapping module 110 can access managed switches to accurately diagram port connectivity for all network devices, resulting in a complete map that illustrates all nodes connected directly to a managed switch with the port information displayed adjacent to the node.

Returning back to FIG. 1, in one implementation of the present application, the mapping module 110 performs Layer-2 mapping. Layer-2, or the data link layer, provides the functional and procedural means to transfer data between network entities and to detect and possibly correct errors that may occur in the physical layer. Originally, this layer was intended for point-to-point and point-to-multipoint media, characteristic of wide area media in the telephone system. Local area network (LAN) architecture, which included broadcast-capable multi-access media, was developed independently of the ISO work, in IEEE Project 802. LAN services typically arrange bits, from the physical layer, into logical sequences called frames.

The uppermost sublayer is Logical Link Control (LLC). This sublayer multiplexes protocols running atop the data link layer, and optionally provides flow control, acknowledgment, and error recovery. The LLC provides addressing and control of the data link. It specifies which mechanisms are to be used for addressing stations over the transmission medium and for controlling the data exchanged between the originator and recipient machines.

The sublayer below the LLC is the Media Access Control (MAC). Sometimes this refers to the sublayer that determines who is allowed to access the media at any one time (usually CSMA/CD), and other times this phrase refers to a frame structure with MAC addresses inside. There are generally two forms of media access control: distributed and centralized. The Media Access Control sublayer also determines where one frame of data ends and the next one starts.

Continuing with FIG. 1, in one implementation of the present application, the mapping module 110 performs Layer-3 mapping. Layer-3, or the network layer, is the third layer out of seven in the OSI model and the third layer out of five in the TCP/IP model. In essence, the network layer is responsible for end to end (source to destination) packet delivery, whereas the data link layer is responsible for node to node (hop to hop) frame delivery. The network layer provides the functional and procedural means of transferring variable length data sequences from a source to a destination via one or more networks while maintaining the quality of service, and error control functions. The network layer deals with transmitting information all the way from its source to its destination.

By performing multi-level discovery, the mapping module 110 leverages multiple discovery methods to provide an integrated OSI Layer-2 and Layer-3 topology map to include
IP address
MAC address
Last logged-in user (requires the optional Responder Clients)
DNS name
Node name (determined by SNMP or other client protocol)
Switch port connection
This topology data may then be stored in a topology database 130.

This multi-level discovery of network infrastructure data in topology database 130 provides a user with easy access to significant time-saving features, including automated representation of topology at levels, to show routers and subnets, additionally managed switches, or additionally, end nodes that can be filtered by type or group to further refine layouts.

Continuing with FIG. 1, the topology mapping unit 100 further includes a STP data collection unit 120. In particular, once the mapping module 110 has formed a topology map, the STP data discovery unit 120 may use this mapping data form a spanning tree to better map the Layer-2 connections within the discovered network elements, as described below in FIGS. 3 and 4.

Once this information of the location of the Layer-2 topology of the network 10 is produced by STP data collection module 120, this information is stored in the STP database 140. The topology database 130 may be updated to reflect this information on Layer-2 topology, using the information in the STP database 140.

Spanning Tree Protocol (STP) is a Layer-2 protocol designed to run on bridges and switches. The spanning tree is a reduction of the Layer-2 network mesh constructed such that packets may be forwarded across the network without any looping. The STP specification is defined in IEEE 802.1D and RSTP (Rapid Spanning Tree Protocol) is defined in IEEE 802.1w (incorporated into IEEE 802.1D-2004). The main goal of STP is to make sure that a loop situation does not occur when there are redundant paths in a network. STP accomplishes this by disabling network loops and providing backup links between switches or bridges. STP allows devices to interact with other STP compliant devices in the network to ensure that only one path exists between any two stations on the network. If STP or a similar protocol is not present in a redundant topology network, switches may endlessly flood broadcast packets to all ports (i.e., broadcast storm). When multiple copies of a frame arrive at different ports of a switch, MAC entry instability in a filtering database may occur.

As the name suggests, STP creates a spanning tree within a mesh network of connected Layer-2 bridges (typically Ethernet switches), and disables the links which are not part of that tree, leaving a single active path between any two network nodes.

The collection of bridges in a LAN can be considered a graph whose nodes are the bridges and whose edges are the cables connecting the bridges. To break loops in the LAN while maintaining access to all LAN segments, the bridges may collectively compute a spanning tree. The spanning tree that the bridges compute using the Spanning Tree Protocol can be determined using process 300, depicted in FIG. 3, described in greater detail below.

Figure 3:
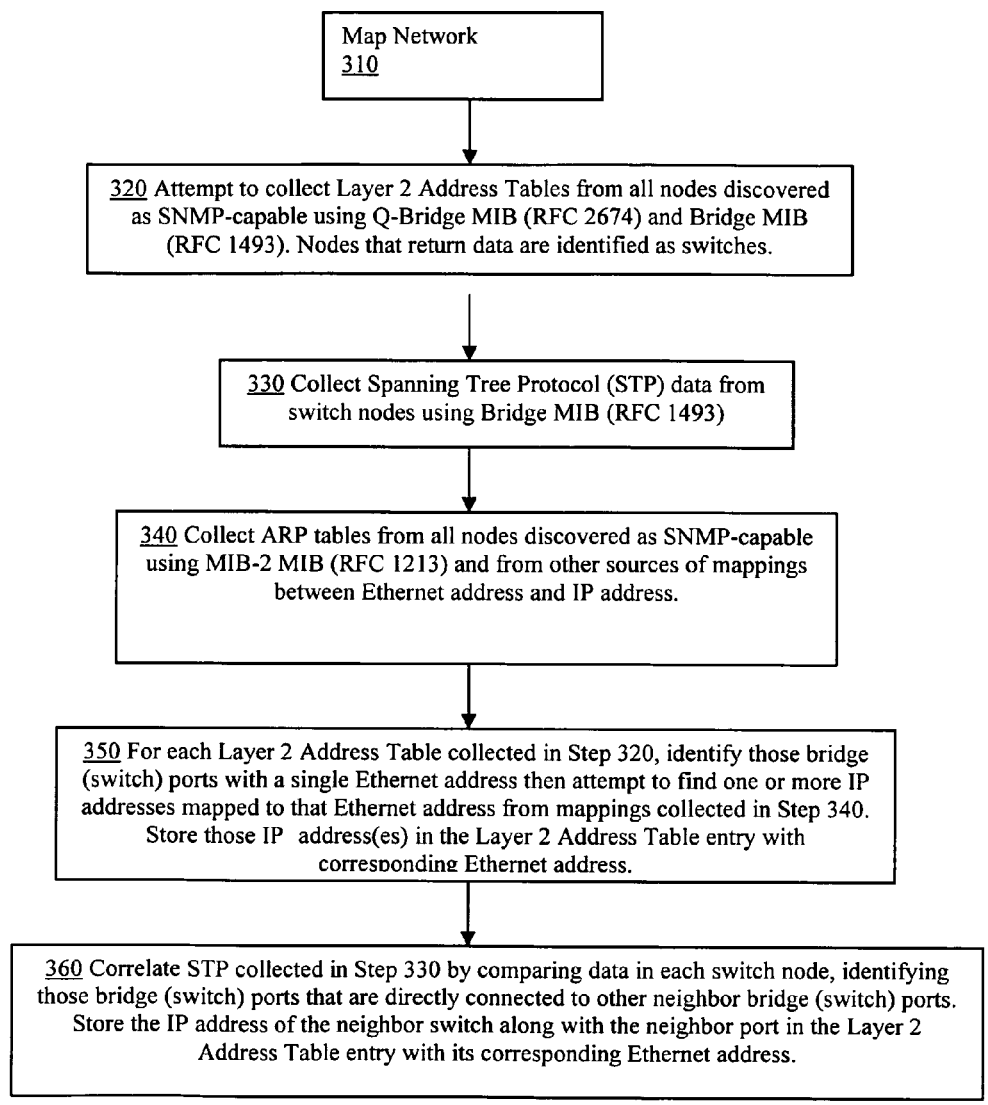
FIGS. 3-4 are flow charts of a STP data collection method in accordance with embodiments of the present application.

Referring now to FIG. 3, embodiments of the present application relate to a STP data collection method 300. The STP data collection method 300 starts with an initial mapping of the network in step 310 to map the network. As discussed above, various topology mapping methods may be used, such as those described in FIG. 2, and the supporting text.

In step 320, the topology mapping attempts to collect Layer-2 Address Tables from all nodes discovered as Simple Network Management Protocol (SNMP) capable using Q-Bridge management information base (MIB) (as defined, for example, in Request for Comments (RFC) 2674) and Bridge MIB (as defined, for example, in RFC 1493). Discovered nodes that return data are then identified as switches. In step 330, STP data is collected from switch nodes using Bridge MIB (as defined, for example, in RFC 1493).

In step 340, Address Resolution Protocol (ARP) tables are collected from all nodes discovered as SNMP-capable using MIB-2 MIB (RFC 1213) and from other sources of mappings between Ethernet address and IP address.

Then, in step 350, for each Layer-2 Address Table collected in Step 320, those bridge (switch) ports with a single Ethernet address are identified. Then, one or more IP addresses mapped to that Ethernet address are found using the mappings collected in Step 340. Those IP address(es) can then be stored in the Layer-2 Address Table entry with its corresponding Ethernet address.

Next, in step 360, STP data collected in step 330 can be correlated by comparing data in each switch node, identifying those bridge (switch) ports that are directly connected to other neighbor bridge (switch) ports. This correlation is described in greater detail in FIG. 4, below and the corresponding disclosure. The IP address of the neighbor switch along with the neighbor port may also be stored in the Layer-2 Address Table entry with a corresponding Ethernet address.

Figure 4:
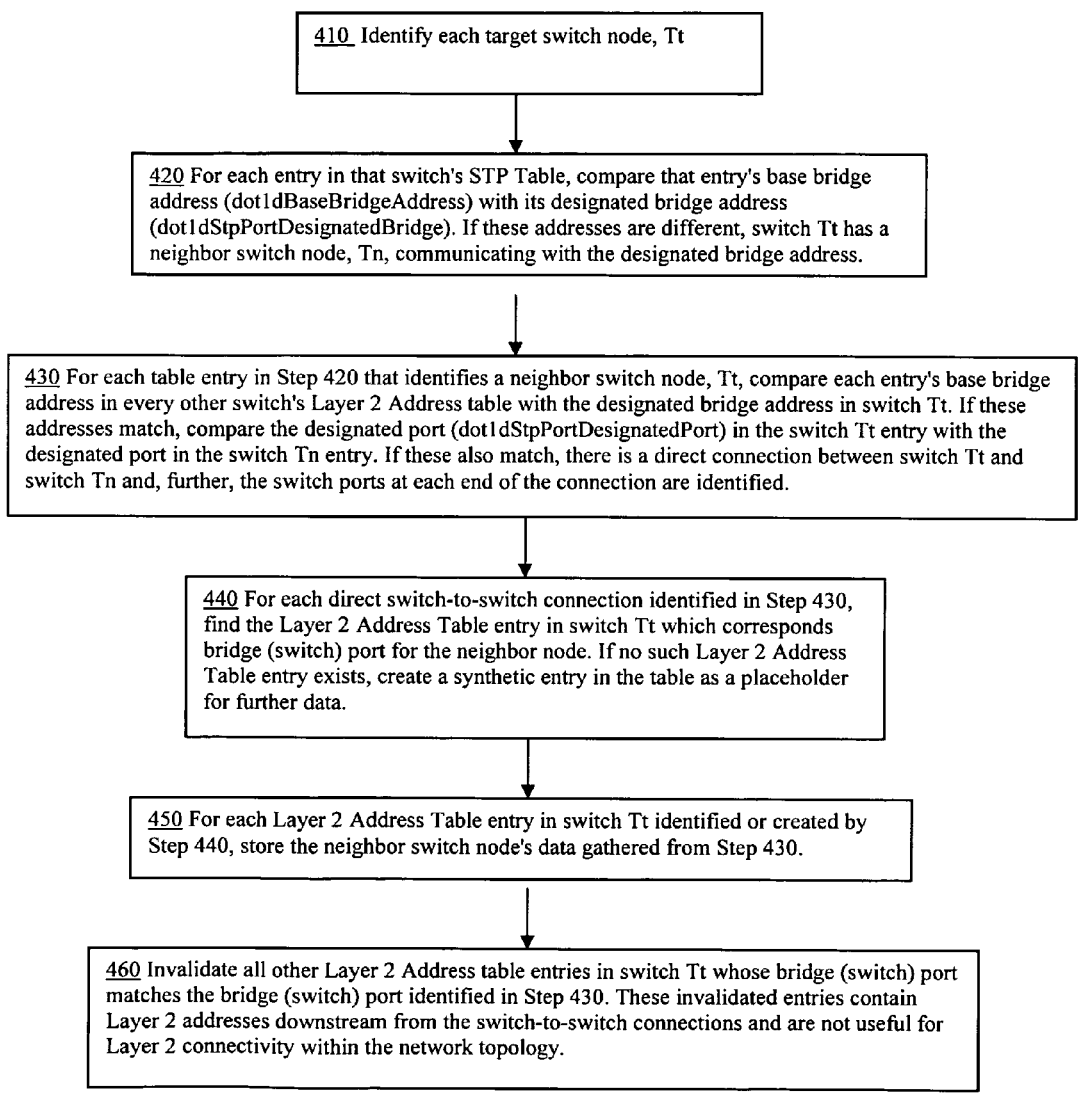

Referring now to FIG. 4, a STP data correlation process 400 is described in greater detail. In particular, the STP data correlation process 400 relates to the specific processing of STP data collected from step 330 and referenced in step 360.

In step 410, each of the target switch nodes, Tt is identified, and each entry in that switch's STP Table is located. Then, in step 420, that entry's base bridge address (dot1dBaseBridgeAddress) is compared with its designated bridge address (dot1dStpPortDesignatedBridge). If these addresses are different, then switch Tt has a neighbor switch node, Tn, communicating with the designated bridge address.

In step 430, for each table entry in step 420 that identifies a neighbor switch node, Tt, each entry's base bridge address is compare in every other switch's Layer-2 Address table with the designated bridge address in switch Tt. If these addresses match, the designated port (dot1dStpPortDesignatedPort) in the switch Tt entry is compared with the designated port in the switch Tn entry. If these values also match, there is a direct connection between switch Tt and switch Tn and, further, the switch ports at each end of the connection are identified.

Continuing to step 440, for each direct switch-to-switch connection identified in Step 430, the Layer-2 Address Table entry in switch Tt which corresponds bridge (switch) port for the neighbor node is found. If no such Layer-2 Address Table entry exists, a synthetic entry in the table is created as a placeholder for further data. For each Layer-2 Address Table entry in switch Tt identified or created by Step 440, the neighbor switch node's data gathered from Step 430 is stored, in step 450.

In step 460, all other Layer-2 Address table entries in switch Tt whose bridge (switch) port matches the bridge (switch) port identified in Step 430 are invalidated. These invalidated entries contain Layer-2 addresses downstream from the switch-to-switch connections and are not useful for Layer-2 connectivity within the network topology.

As discussed above, various embodiments of the invention can be configured in numerous physical elements, or can be configured at a single network element or configured in a number of elements having various disclosed functions distributed throughout. The control of the IP SLA or other monitoring configurations and other functions can be performed at various network components, such as at user equipment, at VOIP server, at an access gateway or at another network component associated with the VOIP network and access to the network.

A person of ordinary skill in the art would understand that the above-discussed embodiments of the invention are for illustrative purposes only, and that the invention can be embodied in numerous configurations as discussed above. Additionally, the invention can be implemented as a computer program on a computer readable medium, where the computer program controls a computer or a processor to perform the various functions which are discussed as method steps and also discussed as hardware or hardware/software elements.

What is claimed:

1. A method for forming a topology mapping, the method comprising:

mapping a topology of a network;
collecting layer-2 address mapping table from the topology mapping;
collecting Spanning Tree Protocol (STP) data;
collecting address translation tables (ARP) from nodes discovered in the mapping;
identifying switches, based on the nodes that return data, using layer-2 address tables; and
correlating STP data, wherein the correlating comprises
comparing data in the switches,
identifying switch ports directly connected to other switch ports,
eliminating direct switch-to-switch port connections from consideration for further layer-2 node mappings,
locating entries for a switch in an associated STP table;
for the switch, comparing a base bridge address with a designated bridge address;
comparing the base bridge address with a neighbor's designated bridge address;
finding a layer-2 address corresponding to an address of the neighbors port;
when no neighbors port layer-2 address is found, creating a synthetic entry;
storing neighbor switch node comprising either said found layer-2 address or said synthetic entry, and
invalidating other layer-2 addresses in said switch.

2. The method of claim 1, wherein the mapping a topology of a network comprises:
transferring synthetic data within the network; and tracing the synthetic data.

3. The method of claim 1, wherein the mapping the topology of the network comprises:
searching for nodes in a pre-defined number of internet protocol (ip) addresses;
repeating the search for a predefined number of hops;
determining layer-2 and layer-3 connectivity from any discovered nodes;
correlating the layer-2 and layer-3 address data; and
determining network connectivity of discovered ip addresses.

4. The method of claim 1, wherein the mapping of the topology of the network comprises receiving and storing user preferences comprising the size of the block of ip addresses and the number of hops.

5. The method of claim 1, wherein the locating of entries for each switch in an associated stp table comprises identifying each target switch node, Tt.

6. The method of claim 5, wherein the base bridge address comprises dot1dBaseBridgeAddress; wherein the designated bridge address comprises dot1dStpPortDesignatedBridge, wherein a difference in the base bridge address and the designated bridge address indicates that the switch node, Tt, has a neighbor switch node, Tn, communicating with the designated bridge address.

7. The method of claim 6, wherein the comparing of the switch's base bridge address with a neighbor switch's designated bridge address comprises:
for each table entry that identifies a neighbor switch node, Tt, comparing each base bridge address the neighbor switch's layer-2 Address table with the designated bridge address in switch Tt;
when the designated bridge address and the neighbor's base bridge address match, comparing the designated port (dot1dStpPortDesignatedPort) in the switch Tt entry with the designated port in the switch Tn entry;
when the designated port (dot1dStpPortDesignatedPort) in the switch Tt entry corresponds with the designated port in the switch Tn entry, determining a direct connection between the switch Tt and the switch Tn; and
identifying switch ports at each end of connection.

8. The method of claim 7, wherein the finding of a layer-2 address corresponding to the address of the neighbors port comprises:

for each identified direct switch-to-switch connection, finding the layer-2 address table entry in switch Tt which corresponds bridge port for the neighbor switch.

9. The method of claim 5, wherein the synthetic entry comprises as a placeholder for further data.

10. The method of claim 5, wherein the storing of neighbor switch node comprising either said found layer-2 address or said synthetic entry is performed for each for each identified or created layer-2 address table entry in switch Tt.

11. The method of claim 5, wherein the invalidating of other layer-2 addresses in said switch comprises invalidating all other layer-2 Address table entries in switch Tt whose bridge (switch) port matches the identified bridge port, wherein said invalidated entries comprise layer-2 addresses downstream from the switch-to-switch connections and are not useful for layer-2 connectivity within the network topology.

12. A computer program for forming a topology mapping, the computer program embodied on a non-transitory computer-readable medium configured to control a processor to perform:
 mapping a topology of a network;
 collecting layer-2 address mapping table from the topology mapping;
 collecting Spanning Tree Protocol (STP) data;
 collecting address translation tables (ARP) from nodes discovered in the mapping;
 identifying switches, based on the nodes that return data, using layer-2 address tables; and
 correlating STP data, wherein the correlating comprises comparing data in the switches,
  identifying switch ports directly connected to other switch ports,
  eliminating direct switch-to-switch port connections from consideration for further layer-2 node mappings,
  locating entries for a switch in an associated STP table,
  for the switch, comparing a base bridge address with a designated bridge address,
  comparing the base bridge address with a neighbor's designated bridge address,
  finding a layer-2 address corresponding to an address of the neighbors port,
  when no neighbors port layer-2 address is found, creating a synthetic entry,
  storing neighbor switch node comprising either said found layer-2 address or said synthetic entry, and invalidating other layer-2 addresses in said switch.

13. The program of claim 12, wherein the mapping a topology of a network comprises: transferring synthetic data within the network; and tracing the synthetic data.

14. The program of claim 12, wherein the mapping the topology of the network comprises:
 searching for nodes in a pre-defined number of ip addresses;
 repeating the search for a predefined number of hops;
 determining layer-2 and layer-3 connectivity from any discovered nodes;
 correlating the layer-2 and layer-3 address data; and
 determining network connectivity of discovered ip addresses.

15. The program of claim 12, wherein the mapping of the topology of the network comprises receiving and storing user preferences comprising the size of the block of ip addresses and the number of hops.

16. The program of claim 12, wherein the locating of entries for each switch in an associated STP table comprises identifying each target switch node, Tt.

17. The program of claim 16, wherein the base bridge address comprises dot1dBaseBridgeAddress; wherein the designated bridge address comprises dot1dStpPortDesignatedBridge, wherein a difference in the base bridge address and the designated bridge address indicates that the switch node, Tt, has a neighbor switch node, Tn, communicating with the designated bridge address.

18. The program of claim 17, wherein the comparing of the switch's base bridge address with a neighbor switch's designated bridge address comprises:
 for each table entry that identifies a neighbor switch node, Tt, comparing each base bridge address the neighbor switch's layer-2 Address table with the designated bridge address in switch Tt;
 when the designated bridge address and the neighbor's base bridge address match, comparing the designated port (dot1dStpPortDesignatedPort) in the switch Tt entry with the designated port in the switch Tn entry;
 when the designated port (dot1dStpPortDesignatedPort) in the switch Tt entry corresponds with the designated port in the switch Tn entry, determining a direct connection between the switch Tt and the switch Tn; and
 identifying switch ports at each end of connection.

19. The program of claim 18, wherein the finding of a layer-2 address corresponding to the address of the neighbors port comprises:
 for each identified direct switch-to-switch connection, finding the layer-2 address table entry in switch Tt which corresponds bridge port for the neighbor switch.

20. The program of claim 12, wherein the synthetic entry comprises as a placeholder for further data.

21. The program of claim 12, wherein the storing of the neighbor switch node comprising either said found layer-2 address or said synthetic entry is performed for each for each identified or created Layer-2 address table entry in switch Tt.

22. The program of claim 12, wherein the invalidating of other layer-2 addresses in said switch comprises invalidating all other layer-2 Address table entries in switch Tt whose bridge (switch) port matches the identified bridge port, wherein said invalidated entries comprise layer-2 addresses downstream from the switch-to-switch connections and are not useful for layer-2 connectivity within the network topology.

23. An apparatus for discovering an network topology, the apparatus comprising:
 a server configured to:
  map a topology of a network;
  collect layer-2 address mapping table from the topology mapping;
  collect Spanning Tree Protocol (STP) data;
  collect address translation tables (ARP) from nodes discovered in the mapping;
  identify switches, based on the nodes that return data, using layer-2 address tables; and
  correlate STP data, wherein the server, when correlating the STP data, is further configured to compare data in the switches,
  identify switch ports directly connected to other switch ports,
  eliminate direct switch-to-switch port connections from consideration for further layer-2 node mappings,
  locate entries for a switch in an associated STP table,
  for the switch, comparing a base bridge address with a designated bridge address, compare the base bridge address with a neighbor's designated bridge address, find a layer-2 address corresponding to an address of the neighbors port, when no neighbors port layer-2 address is found, create a synthetic entry, storage configured to store neighbor switch node comprising either said found layer-2 address or said synthetic entry, and invalidate other layer-2 addresses in said switch.

24. The apparatus of claim 23, wherein the server, in the mapping a topology of the network, is further configured to transfer synthetic data within the network, and trace the synthetic data.

25. The apparatus of claim 23, wherein, when mapping the topology of the network, the server is further configured to:

search for nodes in a pre-defined number of internet protocol (ip) addresses;

repeat the search for a predefined number of hops;

determine layer-2 and layer-3 connectivity from any discovered nodes;

correlate the layer-2 and layer-3 address data; and determine network connectivity of discovered ip addresses.

26. The apparatus of claim 25, wherein the synthetic entry comprises as a placeholder for further data.

27. The apparatus of claim 25, wherein the server, when storing neighbor switch node comprising either said found layer-2 address or said synthetic entry, is further configured to storing said neighbor switch node for each for each identified or created layer-2 address table entry in switch Tt.

28. The apparatus of claim 25, wherein the server, when invalidating other layer-2 addresses in said switch, is further configured to invalidate a plurality of other layer-2 Address table entries in switch Tt whose bridge (switch) port matches the identified bridge port, wherein said invalidated entries comprise layer-2 addresses downstream from the switch-to-switch connections and are not useful for layer-2 connectivity within the network topology.

29. The apparatus of claim 23, wherein the server, when mapping the topology of the network, is further configured to receive and store user preferences comprising the size of the block of ip addresses and the number of hops.

30. The apparatus of claim 23, wherein the server, when locating entries for each switch in an associated stp table, is further configured to identify each target switch node, Tt.

31. The apparatus of claim 30, wherein the base bridge address comprises dot1dBaseBridgeAddress; wherein the designated bridge address comprises dot1dStpPortDesignatedBridge, wherein a difference in the base bridge address and the designated bridge address indicates that the switch node, Tt, has a neighbor switch node, Tn, communicating with the designated bridge address.

32. The apparatus of claim 31, wherein the server, when comparing the switch's base bridge address with a neighbor switch's designated bridge address, is further configured to:

for each table entry that identifies a neighbor switch node, Tt, compare each base bridge address the neighbor switch's layer-2 Address table with the designated bridge address in switch Tt;

when the designated bridge address and the neighbor's base bridge address match, compare the designated port (dot1dStpPortDesignatedPort) in the switch Tt entry with the designated port in the switch Tn entry;

when the designated port (dot1dStpPortDesignatedPort) in the switch Tt entry corresponds with the designated port in the switch Tn entry, determine a direct connection between the switch Tt and the switch Tn; and identify switch ports at each end of connection.

33. The apparatus of claim 23, wherein the server, when finding the layer-2 address corresponding to the address of the neighbors port, is further configured to: for each identified direct switch-to-switch connection, find the layer-2 address table entry in switch Tt which corresponds bridge port for the neighbor switch.

* * * * *